Patented Dec. 27, 1938

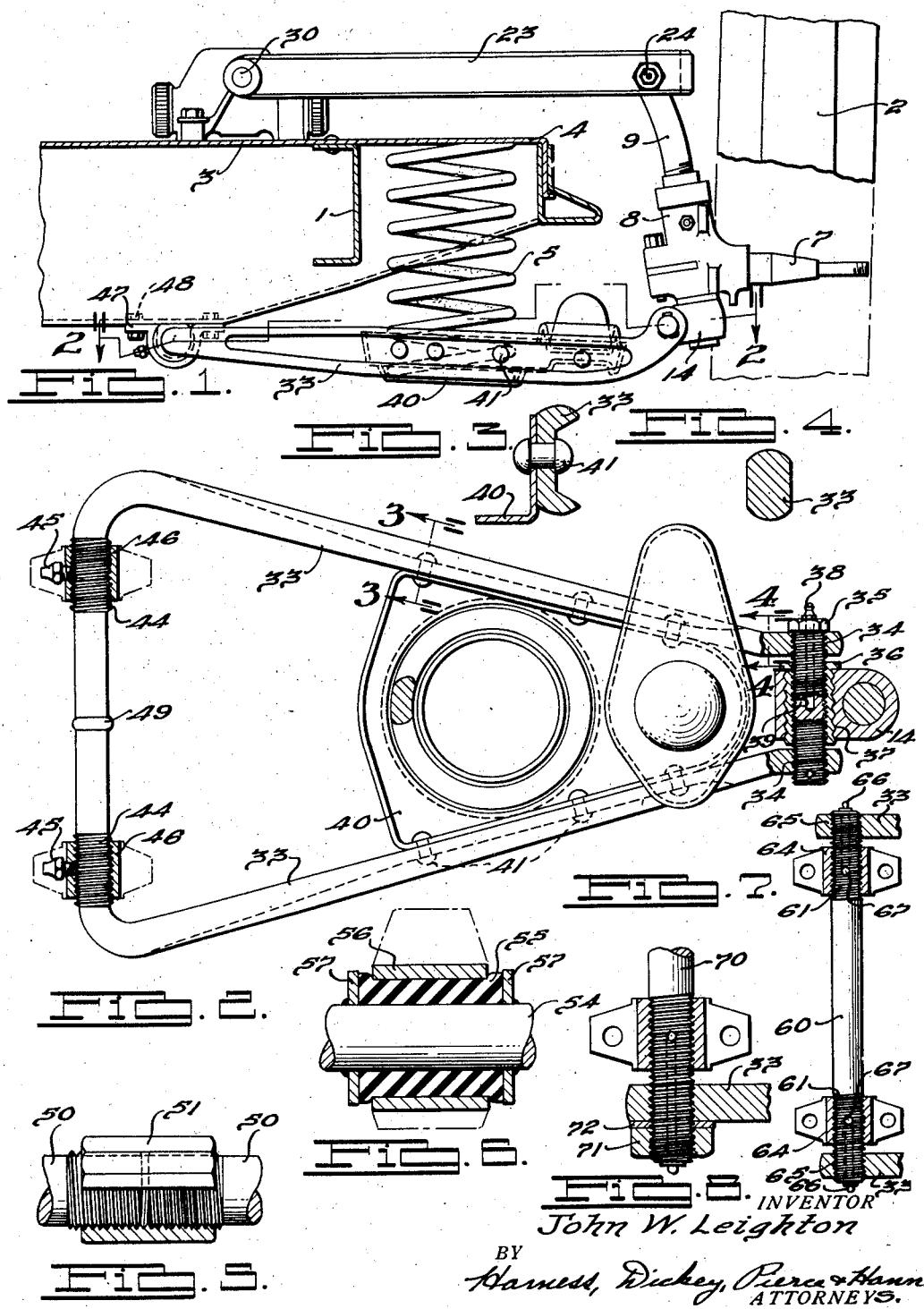

2,141,215

UNITED STATES PATENT OFFICE 2,141,215

INDEPENDENT WHEEL SUSPENSION

John W. Leighton, Port Huron, Mich.

Application August 17, 1936, Serial No. 96,422

4 Claims. (Cl. 267—20)

The present invention relates to independent wheel suspensions. More particularly it relates to a novel form of independent wheel suspension, particularly adapted for the mounting of front wheels of automotive vehicles.

This application is a continuation in part of applicant's prior co-pending application, Serial No. 59,808, filed January 20, 1936, and is related to applicant's co-pending application Serial No. 69,786, filed March 20, 1936.

A general object of the present invention consists in the provision of an independent wheel suspension construction embodying an improved bearing for the pivotal connections between the wishbones which interconnect the frame of the vehicle and the king pin or other member on which the wheel is mounted.

One of the important objects of the present invention resides in the provision of a threaded bearing connection between the lower wishbone and the frame of the vehicle so arranged that the loaded zone of the bearing connection is at the under side thereof in order that the loaded zone will coincide with the point at which the lubricant tends to collect.

Another object of the present invention consists in the provision of a novel form of wishbone construction which is particularly simple, strong, and rugged, and which is relatively easily assembled and easily maintained in proper alignment and adjustment.

Yet another object of the present invention consists in the provision of a method for assembling the novel wishbone construction herein illustrated and described, which results in a construction which is particularly strong and rugged and which greatly simplifies the process of manufacture of independent wheel suspensions of the generic type disclosed herein.

Still further, the present invention contemplates the provision of a construction in which spaced threaded bearings are utilized for pivotally connecting the wishbone to the frame of the vehicle and the provision of a wishbone construction journaled in these threaded bearings in such a manner that the wishbone as a whole is maintained in proper co-axial alignment with the spaced bearings at all times, thus insuring a relatively friction-free pivotal mounting thereof with respect to the frame of the vehicle.

Many other and further objects and advantages of the present invention will become apparent from the following specification when considered in connection with the accompanying drawing forming a part thereof.

In the drawing:

Figure 1 is a vertical, sectional view with portions broken away through the front end of an automobile chassis, showing in detail the construction and arrangement of the improved independent wheel suspension;

Fig. 2 is a horizontal, sectional view, taken substantially on the line 2—2 of Fig. 1, illustrating in detail the mounting and construction of the improved wishbone construction;

Fig. 3 is an enlarged, transverse, sectional view, taken substantially on the line 3—3 of Fig. 2, showing the cross section of one arm of the improved wishbone and the mounting of the spring supporting pan with respect thereto;

Fig. 4 is an enlarged, sectional view, taken substantially on the line 4—4 of Fig. 2, illustrating in detail the cross section of one arm of the wishbone adjacent the outer end thereof;

Fig. 5 is an enlarged, fragmentary, elevational view with portions broken away illustrating a modified means of interconnecting the adjacent ends of the arms of the wishbone;

Fig. 6 is an enlarged, sectional view illustrating a modified form of construction for pivotally connecting the wishbones to the frame of the vehicle;

Fig. 7 is a fragmentary transverse sectional view corresponding to that shown in Fig. 2, but showing a modified form of lower wishbone assembly and pivotal mounting;

Fig. 8 is a further modification of a lower wishbone pivotal mounting similar to that shown in Fig. 7.

With more detailed reference to the drawing and particularly to the specific embodiment of the invention disclosed in Fig. 1 thereof, the improved front wheel suspension shown is utilized for the purpose of resiliently interconnecting a frame member 1 of the body with a wheel 2. The frame member 1, as is conventional in the art, has permanently secured thereto a plurality of transverse brace members 3 which serve to connect this frame member with a corresponding similar frame member at the opposite side of the vehicle chassis.

As is conventional in constructions of this general type, the transverse frame member 3 is extended outwardly beyond the longitudinal frame member 1 to provide a housing or abutment 4 for the upper end of a vertically disposed compression coil spring 5. The wheel 3 is journaled for rotation upon a stub axle 7 which is preferably integrally connected with a generally cylindrical housing 8 which surrounds a king pin 9. The housing 8 is preferably internally threaded to receive the externally threaded king pin 9 and provide a threaded bearing providing for pivotal movement of the stub axle with respect to the king pin. The detailed construction of housing 8 and king pin 9 form no part of the invention claimed herein, being claimed in applicant's aforementioned co-pending application wherein they are fully disclosed. As is conventional in constructions of this type, a steering arm (not shown) may also be suitably connected to the housing 8 to provide means for regulating the angular position of the stub axle in order to steer the vehicle. The lower end of the king pin 9 extends through the housing 8 and has threaded thereon a fitting 14 which, as will hereinafter be seen, serves to provide means for mounting the improved lower wishbone construction hereinafter described in detail.

The upper end of the king pin 9 is pivotally connected to the outer end of the upper wishbone or link 23 at 24, preferably in the manner set forth in applicant's above mentioned co-pending application. The inner end of the wishbone 23 may be pivotally connected by means of suitable bearings 30 to the frame 3 in substantially the manner described in detail in applicant's prior co-pending application, Serial No. 31,986, filed July 18, 1935.

The lower wishbone construction with which the present application is primarily concerned may preferably comprise a pair of similar, substantially L-shaped forgings 33, which have their outer ends internally threaded at 34 to receive an externally threaded pivot pin 35. An internally threaded bushing 36 is provided on its external surface with locking threads 37 which serve to seat it firmly and non-rotatably in position in a transversely extending bore through the fitting 14 which, as has been described above, is threaded onto the lower end of the king pin 9 beneath the housing 8. It will be appreciated that the pivot pin 35 is locked firmly in position with respect to the outer end of the forgings 33 and consequently provides a threaded bearing with respect to the bushing 36 and fitting 14 in which this bushing is firmly locked. The pivot pin 35 is provided with a lubricating fitting 38 in the end of the pin, which fitting communicates with a suitable lubricating bore 39 for internally lubricating the threaded bearing. The outward extending portions of the forgings 33 are preferably deformed to provide a channel cross section, such as is shown in detail in the sectional view in Fig. 3 and these two members have mounted therebetween a spring supporting pan 40 which may be secured to the forgings 33 by means of suitable rivets 41 and which provides a receptacle for receiving the lower end of the spring 5.

The bases of the L-shaped forgings 33 are preferably substantially cylindrical in cross section and are provided with externally threaded portions 44, the purpose and function of which will hereinafter more clearly be seen. These base portions are preferably bent to lie in substantially end-to-end abutting relation, in order that the two cylindrical base portions of the L-shaped forgings will have substantially a common axis. Brackets 46, having internally threaded bores, are threaded onto the external threads 44 on the base portions of the L-shaped forgings 33 and, as is best seen in Fig. 1, these brackets 46 are provided with lugs or ears 47 which provide means by which they may be secured to the frame by suitable bolts 48. After the brackets 46 have been screwed onto the external threads 44 on the forgings 33, the abutting ends of these forgings may be permanently secured together by a weld 49 in order that the base portions of these L-shaped forgings will be permanently maintained in axial alignment.

The threaded bearings in the brackets 46 are lubricated through suitable fittings 45 of conventional design. A salient advantage of the structure disclosed in this application resides in the fact that the axial portions of the threaded bearings at the inner end of the wishbone are formed as portions of the wishbone while in prior structures, such as shown in applicant's prior application Serial No. 31,986, referred to above, the wishbone forms the outer bearing member and the inner bearing member is fixedly carried by the frame of the vehicle. It will therefore be clear that heretofore the load zone of these threaded bearings has been on the upper side thereof, while in the construction described herein the load zone is on the lower side of the bearing and hence the lubrication of the bearing as a whole is greatly facilitated.

It will be appreciated that in order to obtain the desired strength characteristics in a structure of this general type, it is preferable that the bearings which provide the pivotal mounting for the inner end of the wishbone construction be substantially spaced one from another and maintained in accurate predetermined axial alignment. It will therefore be appreciated that the permanent securement of the abutting ends of the forgings 33 by means of the weld 49 provides a construction which absolutely insures a definite co-axial relation between the spaced externally threaded portions 44 on the base portions of these forgings. After these forgings have been secured together, it will be appreciated that brackets 46 may be bolted to the frame by means of the bolts 48, thus providing an extremely satisfactory friction-free pivotal mounting for the inner end of the lower wishbone construction.

In Fig. 5 is illustrated a modified means of interconnecting the adjacent abutting ends of the forgings, which may, if desired, be substituted for the welded connection 49. In this form of the invention, the adjacent abutting ends 50 of the forgings are externally threaded and a coupling member 51, similar in construction to a conventional pipe coupling, is used to provide a rigid, co-axial, interconnection between these members.

In Fig. 6 is illustrated a further modified form of the invention, in which modified means are provided for establishing a pivotal connection between the base portions 54 of the forgings and the frame of the vehicle. In this form of the invention, the base portions 54 of these forgings are surrounded by a deformable elastic bushing 55, which is confined within the tubular portion of a bracket 56 adapted for securement to the frame in substantially the manner described above. Washer members 57 are pressed axially toward each other on opposite sides of the bushing in order to deform the bushing and place it under a condition of substantial deformation in order that the surfaces thereof will firmly grip the surface of the forgings 54 and the brackets 56 and establish a definite bond therewith. These washers 57 are preferably welded in position in order to maintain this elastic annulus under a condition of substantial mass tension. Consequently, it will be appreciated that as pivotal movement between the brackets 56 and the forgings 54 takes place, this movement will be absorbed by the molecular deformation of the elastic annulus rather than by a slipping between either the brackets or the forgings 54. This construction has been found to provide one which is extremely satisfactory for relatively limited pivotal movement and one in which the necessity of lubrication is done away with.

In Fig. 7 is illustrated a modified form of the lower wishbone wherein the forgings 33 are formed separately from the journal 60 of the threaded bearing forming the pivotal connection between the lower wishbone and the vehicle frame. In this form the journal 60 comprises a straight shaft having exteriorly threaded portions 61 at its ends, which portions are adapted to cooperate with the interiorly threaded bearing surfaces on brackets 64 secured to the frame in the manner previously described. The inner ends of the forgings 33 are provided with threaded openings 65 adapted to receive the extremities of the threaded journal 60. In order to prevent relative rotational movement between the inner ends of the forgings 33 and the journal 60, the pitch diameter of the threads on the ends of the journal 60 is slightly greater than the pitch diameter of the threads in the openings 65 of forgings 33, with the result that when these two members are threaded together they will have a pressed or jammed fit which will positively lock them against relative rotation. In order to permit the initial threading of the forgings 33 upon the journal 60, the end thread, or the two end threads on member 60 are of slightly reduced pitch diameter with the result that they will operate as pilot threads, thus making it possible to readily start the journal 60 into the threaded openings 65. In this form of the invention the lubricating fittings 66 are preferably mounted in the ends of the journal 60 and communicate with the threaded bearing surfaces through suitable conduits 67. In all other respects the lower wishbone construction illustrated in part in Fig. 7 is similar to that disclosed in Figs. 1 and 2, and functions in the same manner. It will be noted that in this form of the invention, as well as that shown in Figs. 1 and 2, the load zone is at the lower side of the bearings which connects the wishbone to the frame with the result that an adequate supply of lubricant at the loaded zone is insured.

In Fig. 8 is shown a further modification similar to that shown in Fig. 7 but in which the arms 33 of the lower wishbone are fixedly secured against rotation on the journal 70 by means of a lock nut 71 and lock washer 72. It will be observed that when this form of the invention is utilized, an ordinary threaded fit may be provided between the journal 70 and the arms 33, as distinguished from the jam fit in the modification shown in Fig. 7, and that accordingly, the device will be less expensive to manufacture and easier to assemble than that shown in Fig. 7. In all other respects, the modification shown in Fig. 8 corresponds to that shown in Figs. 1, 2, and 7.

It is to be understood that the structure shown in Figs. 1, 2, 7, and 8 may be utilized in connection with a rubber bearing of the type shown in Fig. 6 in place of the threaded bearing illustrated in these figures.

It will be appreciated that the construction described above provides an extremely simple, rugged, and satisfactory, independent suspension for vehicle wheels and one which is relatively simply assembled. It may be further appreciated that the specific embodiments of the invention shown in the drawings and described above are merely illustrative of preferred forms of the invention which the generic inventive concept defined in the subjoined claims may take. Many other and further modifications will be apparent to those skilled in the art.

I claim as my invention:

1. A link for an independent wheel suspension, said link having three portions fixedly secured together and defining the three sides of a generally triangularly shaped structure, two of said side portions being formed by means of an integral bar bent intermediate its ends, a pair of spaced journals on one of said last-mentioned side portions for pivotally connecting said link to a vehicle frame, and means at the apex opposite said one side portion for pivotally securing said link to a king pin assembly.

2. A link for an independent wheel suspension, said link having three portions fixedly secured together and defining the three sides of a generally triangularly shaped structure, two of said side portions being formed by means of an integral bar bent intermediate its ends, a pair of spaced journals on one of said last-mentioned side portions for pivotally connecting said link to a vehicle frame, and a threaded shaft threaded through both of the other of said side portions adjacent the apex of said triangle opposite said one side portion, said shaft being locked against rotation with respect to said link and having an intermediate threaded portion constituting a threaded journal for pivotally supporting a king pin assembly.

3. A link for an independent wheel suspension comprising a pair of substantially L-shaped members, each having a threaded journal formed on the base thereof, said base portions of said members being welded together in abutting relation, and means secured to the opposite ends of said members for pivotally connecting the link to a king pin.

4. A link for an independent wheel suspension comprising a pair of substantially L-shaped members, each having a threaded journal formed on the base thereof, said base portions of said members being welded together in abutting relation, and means secured to the opposite ends of said members for pivotally connecting the link to a king pin, said last-named means comprising a threaded journal threaded through aligned openings in said opposite ends of said members and locked against rotation with respect thereto.

JOHN W. LEIGHTON.